(12) United States Patent
Chen et al.

(10) Patent No.: US 11,332,615 B2
(45) Date of Patent: May 17, 2022

(54) CORE/SHELL TERNARY BLEND AND PREPARATION THEREOF

(71) Applicant: BASF SE, Ludwigshafen am Rhein (DE)

(72) Inventors: Jie Chen, Shanghai (CN); Ming-bo Yang, Chengdu (CN); Bo Yin, Chengdu (CN); Rui Dou, Chengdu (CN)

(73) Assignee: BASF SE, Ludwigshafen am Rhein (DE)

( * ) Notice: Subject to any disclaimer, the term of this patent is extended or adjusted under 35 U.S.C. 154(b) by 237 days.

(21) Appl. No.: 16/616,863

(22) PCT Filed: May 22, 2018

(86) PCT No.: PCT/CN2018/087810
§ 371 (c)(1),
(2) Date: Nov. 25, 2019

(87) PCT Pub. No.: WO2018/214868
PCT Pub. Date: Nov. 29, 2018

(65) Prior Publication Data
US 2021/0147675 A1    May 20, 2021

(30) Foreign Application Priority Data

May 26, 2017    (WO) ................ PCT/CN2017/086150

(51) Int. Cl.
*C08L 77/06*      (2006.01)
(52) U.S. Cl.
CPC ........... *C08L 77/06* (2013.01); *C08L 2205/03* (2013.01); *C08L 2207/53* (2013.01)

(58) Field of Classification Search
CPC ..................................................... C08L 77/06
See application file for complete search history.

(56) References Cited

U.S. PATENT DOCUMENTS

| | | | |
|---|---|---|---|
| 4,174,358 A | 11/1979 | Epstein | |
| 5,234,993 A * | 8/1993 | Huynh-Ba | C08L 77/00 525/179 |
| 6,319,976 B1 * | 11/2001 | DeNicola, Jr | C08F 255/00 524/504 |
| 7,855,251 B2 | 12/2010 | Rogunova | |

(Continued)

FOREIGN PATENT DOCUMENTS

| CN | 101448898 A | 6/2009 |
|---|---|---|
| CN | 102471556 A | 5/2012 |
| WO | 0036011 A1 | 6/2000 |

OTHER PUBLICATIONS

Li, et al., "Characterization of PA6/EPDM-g-MA/HDPE ternary blends: The role of core-shell structure", Polymer, vol. 53, Issue 14, Jun. 21, 2012, pp. 3043-3051.

(Continued)

*Primary Examiner* — Michael F Pepitone
(74) *Attorney, Agent, or Firm* — Armstrong Teasdale LLP

(57) ABSTRACT

The invention relates to a ternary blend having a core/shell structure including (1) PA as a matrix, and (2) a core/shell particle. The ternary blend includes 60-80 wt % of PA and 20-40% of core/shell particle based on the total weight of the ternary blend. The shell is EPDM-g-MA, and the core is PP or PC.

8 Claims, 5 Drawing Sheets

(56) References Cited

U.S. PATENT DOCUMENTS 8,802,751 B2    8/2014  Lyons

OTHER PUBLICATIONS

Ma, et al., "Toughening of polyamide 6 with β-nucleated thermoplastic vulcanizates based on polypropylene/ethylene-propylene-diene rubber grafted with maleic anhydride blends", Materials and Design, vol. 33, Jan. 2012, pp. 104-110.
Mazidi, et al., "Structure-property relationships in super-toughened polypropylene-based ternary blends of core-shell morphology", RSC Advances, vol. 6, Issue 2, 2016, pp. 1508-1526.
Wilkinson, et al., "The effects of SEBS-g-maleic anhydride reaction on the morphology and properties of polypropylene/PA6/SEBS ternary blends", Polymer, vol. 45, Issue 15, Jul. 12, 2004, pp. 5239-5249.
International Search Report for International Application No. PCT/CN2018/087810, dated Aug. 23, 2018, 2 pages.
Written Opinion of the International Searching Authority for International Application No. PCT/CN2018/087810, dated Aug. 23, 2018, 4 pages.

\* cited by examiner

CORE/SHELL TERNARY BLEND AND PREPARATION THEREOF

CROSS-REFERENCE TO RELATED APPLICATIONS

This application is a U.S. National Phase Application of PCT/CN2018/087810, filed May 22, 2018, which claims the benefit of priority to CN Application No. PCT/CN2017/086150, filed May 26, 2017, the contents of which are hereby expressly incorporated by reference in their entirety.

FIELD OF THE INVENTION

The invention relates to a ternary blend having a core/shell structure. The invention also relates to a method of preparing said ternary blend.

DESCRIPTION OF RELATED ARTS

Polyamide (PA) such as PA6 (Polyamide 6) is an important engineering plastic product, which is widely used in the Automotive and E&E industry. However, poor notched toughness of PA restricts its application as a high performance plastic. As a conventional approach, rubbers are added into PA to obtain PA composites having high toughness. However, this results in largely decreased stiffness and dimensional stability.

M. M Mazidi etc. disclosed a super-toughened polypropylene-based PP/EPDM-g-MA/PA6 (polypropylene/ethylene-propylene-diene copolymer-g-maleic anhydride/polyamide 6) ternary blend in *RSC Adv.*, 2016, 6, 1508. In this ternary blend, PP is a matrix, EPDM-g-MA is a shell, and PA6 is a core.

A. N Wilkinson etc. disclosed a PP/PA6/SEBS (polypropylene/polyamide 6/poly[styrene-b-(ethylene-co-butylene)-b-styrene]) ternary blend in *Polymer* 45 (2004) 5239-5249. In this ternary blend, PP is a matrix, and PA6/SEBS is a dispersed phase.

Lan-peng Li etc. disclosed a PA6/EPDM-g-MA/HDPE (polyamide 6/ethylene-propylene-diene copolymer-g-maleic anhydride/high density polyethylene) ternary blend in *Polymer* 53 (2012) 3043-3051. In this ternary blend, PA6 is a matrix, EPDM-g-MA is a shell, and HDPE is a core.

Li-Feng Ma etc. studied toughening of PA6 with β-nucleated thermoplastic vulcanizates (TPVs) based on PP/EPDM-g-MAH (polypropylene/ethylene-propylene-diene copolymer-g-maleic anhydride) blends in *Materials and Design* 33 (2012) 104-110.

However, none of those ternary blends can improve the toughness of PA significantly. Therefore, three is still a need for obtaining a PA (e.g. PA6) blend having higher toughness.

SUMMARY OF THE INVENTION

Thus, a ternary blend having a core/shell structure is provided, comprising:
(1) PA as a matrix, and
(2) a core/shell particle, wherein the shell is EPDM-g-MA, and the core is PP or PC.

EMBODIMENTS OF THE INVENTION

Figure 1:
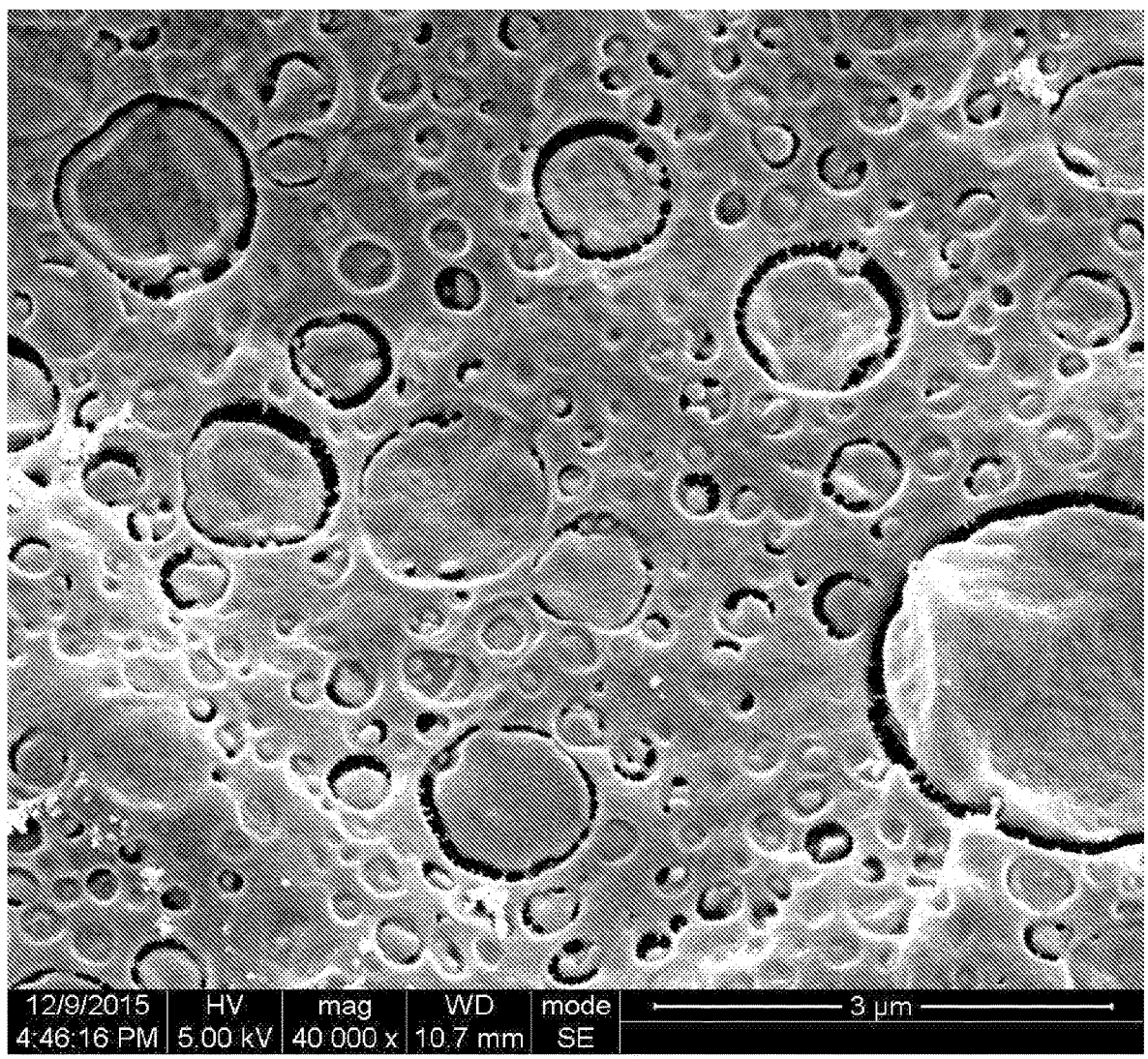
FIG. 1 shows a SEM micrograph of phase morphology for PA6/EPDM-g-MA/PP ternary blends with EPDM-g-MA etched according to example 1 of the invention.
Figure 2:
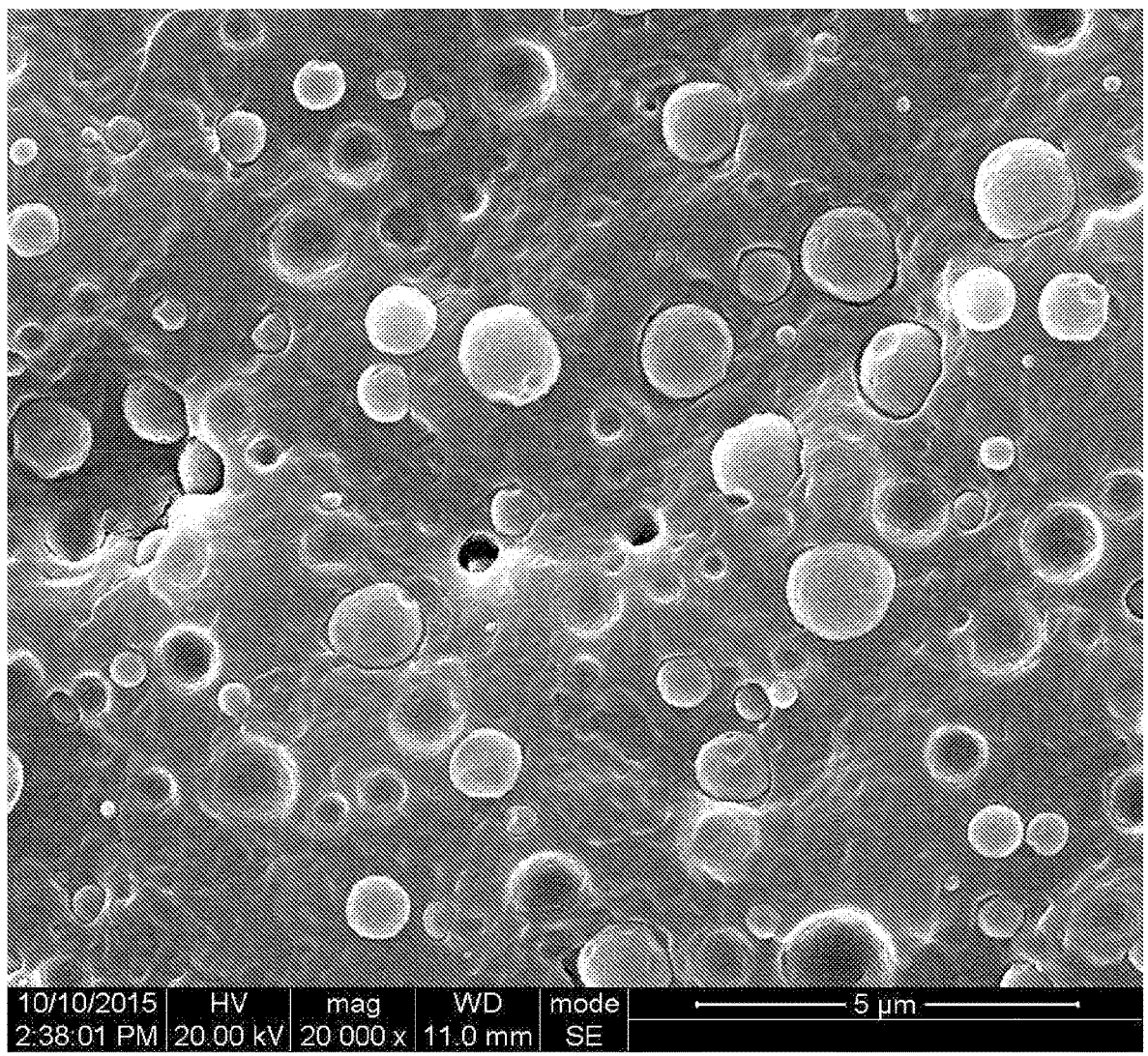
FIG. 2 shows a SEM micrograph of phase morphology for PA6/EPDM-g-MA/PC ternary blends with EPDM-g-MA etched according to example 2 of the invention.
Figure 3:
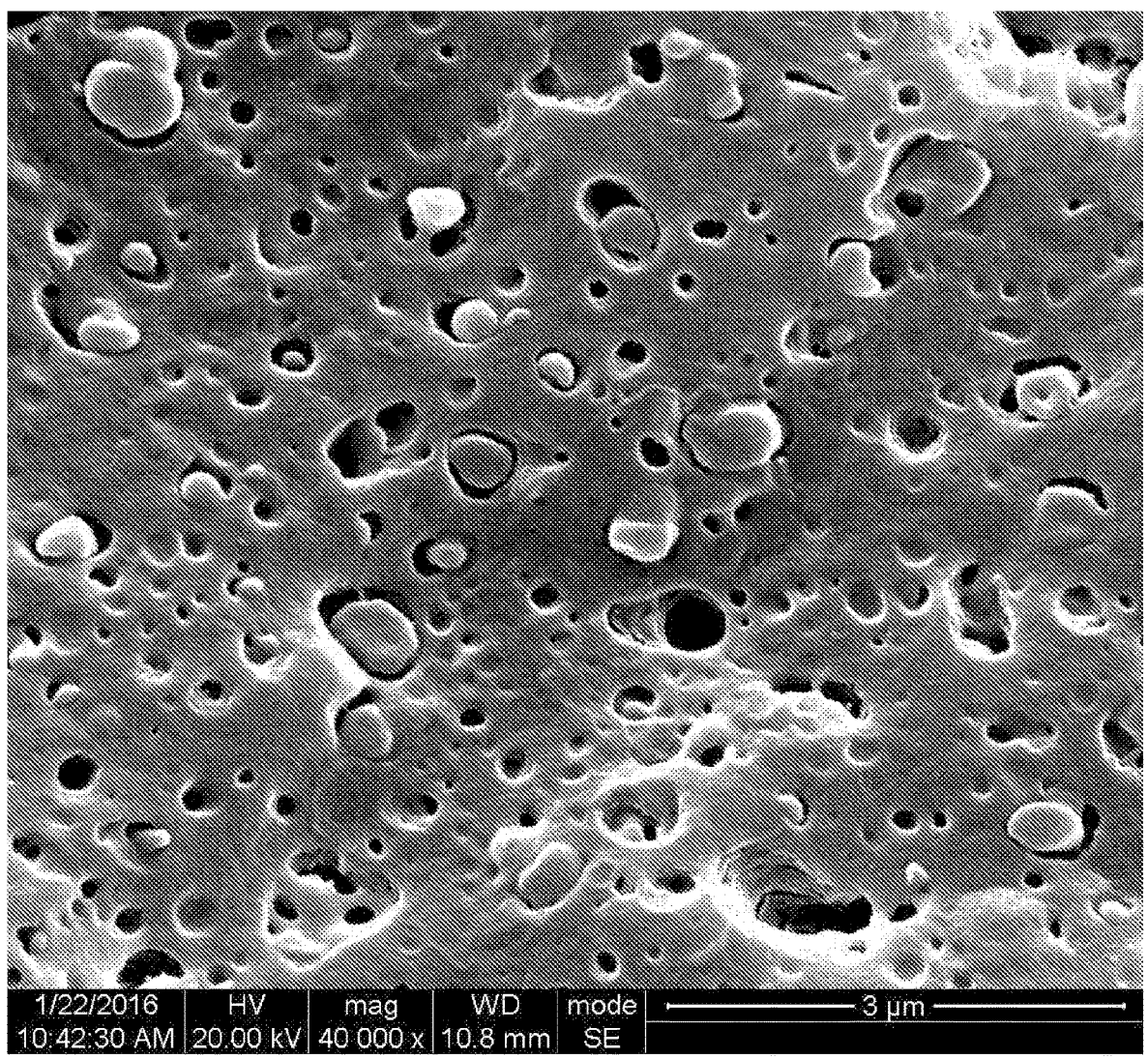
FIG. 3 shows a SEM micrograph of phase morphology for PA6/EPDM-g-MA/PC ternary blends with EPDM-g-MA etched according to example 3 of the invention.
Figure 4:
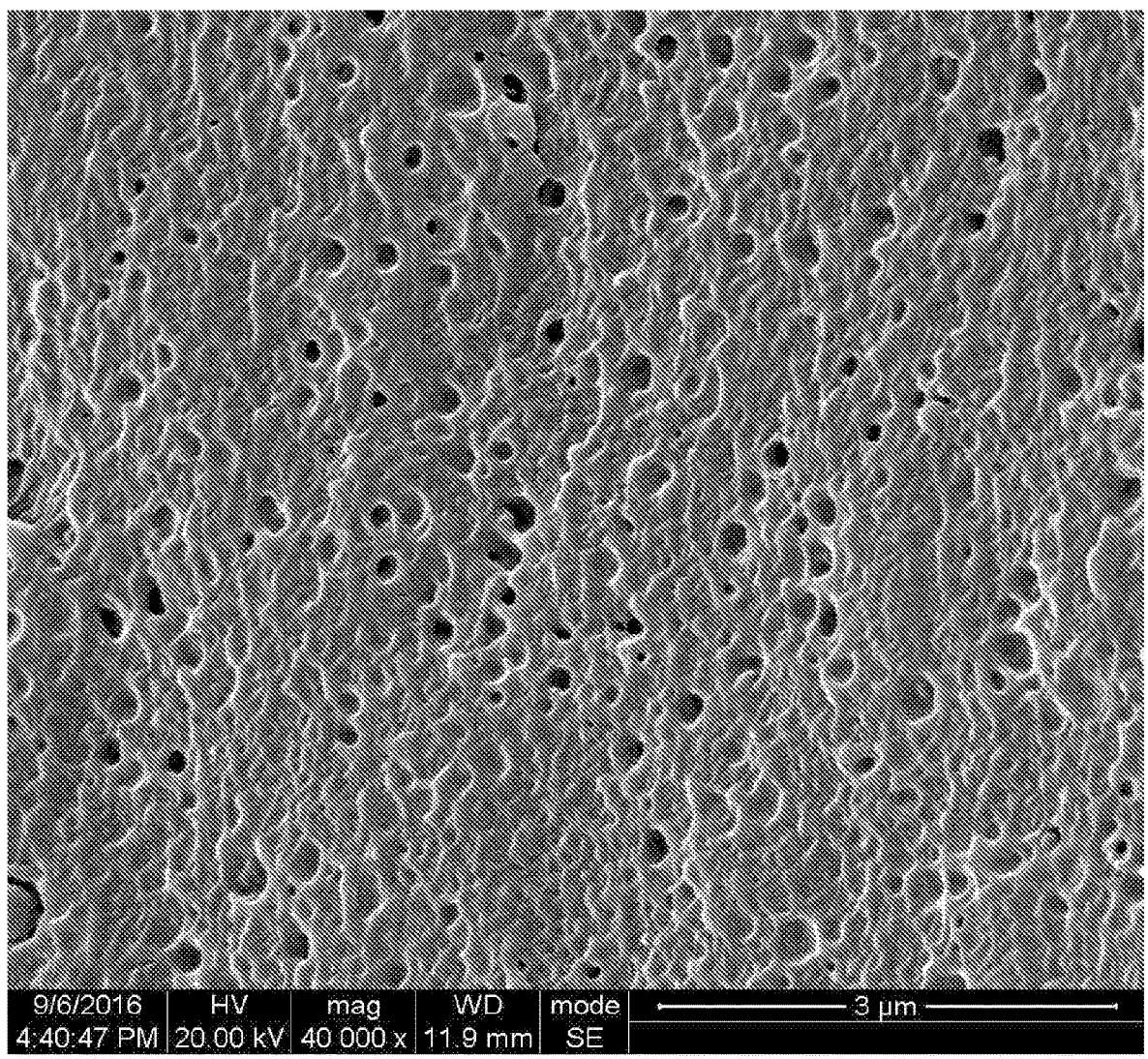
FIG. 4 shows a SEM micrograph of phase morphology for PA6/EPDM-g-MA binary blends with EPDM-g-MA etched according to comparative example 1 of the invention.

There is no particular limitation for the selection of PA. Generally, PA comprises PA6, PA66, PA11, PA12, PA46, PA610, PA612, PAI010, and combination thereof. Preferably, PA is PA6 or PA66.

The ternary blend comprises 60-80 wt % of PA and 20-40% of core/shell particle based on the total weight of the ternary blend.

The ternary blend comprises 60-80 wt % of PA, 5-35 wt % of shell and 2-35 wt % of core based on the total weight of the ternary blend. Preferably, the ternary blend comprises 60-80 wt % of PA, 7.5-30 wt % of EPDM-g-MA and 2.5-30 wt % of PC based on the total weight of the ternary blend.

In one preferred embodiment of the present invention, the ternary blend comprises 60-80 wt % of PA, 10-20 wt % of EPDM-g-MA and 10-20 wt % of PC based on the total weight of the ternary blend.

In another embodiment of the present invention, the ternary blend comprises 60-80 wt % of PA, 7.5-30 wt % of EPDM-g-MA and 5-30 wt % of PP based on the total weight of the ternary blend. Preferably, the ternary blend comprises 60-80 wt % of PA, 10-20 wt % of EPDM-g-MA and 10-20 wt % of PP based on the total weight of the ternary blend.

Generally, the average particle size of the core/shell particle is in the range of 0.1 to 10 μm, preferably 0.2 to 2 μm.

The ternary blend can further comprise additives. There is no particular limit for the additives. For example, the additives can comprise anti-oxidant, glass fiber, mineral filler, anti-hydrolytic agent, pigment, anti-wear agent, plasticizer, heat stabilizer, anti-foaming agent, anti-static agent, UV stabilizer, and combination thereof. Additives can be added in a conventional amount in the art.

In one preferred embodiment of the present invention, PC can be ethylene copolymer modified PC, the ethylene copolymer could be ethylene acrylic acid copolymer (EAA), in order to enhance compatibility with EPDM-g-MA. The modification can be carried out according to conventional methods in the art.

The method of preparing a ternary blend is known for a skilled person in the art. For example, the ternary blend can be prepared by compounding each component together at the temperature of 220-280° C. by extrusion device such as extruder in the art. Alternatively, the ternary blend can be prepared by firstly forming a core/shell particle, and then compounding the core/shell particle with the matrix.

There is no particular theoretically limit for materials used in the invention, and all materials are available in the markets. Generally, PA has a number average molecular weight of 1,000-10,000,000 g/mol, preferably 15,000-30,000 g/mol. EPDM-g-MA has a number average molecular weight of 1,000-10,000,000/mol, preferably 37,000-40,000 g/mol. PP has a number average molecular weight of 1,000-10,000,000/mol, preferably 100,000-200,000 g/mol. PC has a number average molecular weight of 1,000-10,000,000/mol, preferably 35,000-50,000 g/mol.

The resulting ternary blend can be used in various applications, such as automobile manufacturing, machinery and equipment production, electrical and electronic industry, chemical equipment production, building, etc.

All percentages are mentioned by weight unless otherwise indicated.

EXAMPLES

The present invention is now further illustrated by reference to the following examples, however, the examples are used for the purpose of explanation and not intended to limit the scopes of the invention.

Materials:
PA6 (Polyamide 6), BG33 from BASF
PP (Polypropylene), T30S from Lanzhou Petrochemical, China
EPDM-g-MA (Ethylene-propylene-diene copolymer, 0.7 wt % maleic anhydride), Polyram, Bondyram 7001
PC (polycarbonate), LG chem, 1201
EAA (Ethylene acrylic acid), DOW, 3343
DBTO (Di-n-butyltin oxide, 98%), STREM chemicals. INC., 93-5010

Test Methods:
Young's modulus is determined according to ISO-572-2
Impact strength is determined according to test ISO-180A Example 1

PA6 (4900 g) and PP (1050 g) are dried at 80° C. for 12 h in an oven, and EPDM-g-MA (1050 g) is dried at 60° C. for 4 h in an oven. PA6, PP and EPDM-g-MA are compounded via a twin screw extruder at 250° C. to make PA6/EPDM-g-MA/PP (7/1.5/1.5) ternary blends.

The obtained blends are pelleted and dried, and are shaped into standard specimens by using injection molding. Morphology and mechanical properties are characterized on the standard specimens.

Example 2

PC is dried at 120° C. for 4 h in an oven, and EAA is dried at 60° C. for 12 h in an oven. Then, PC (700 g), EAA (700 g) and interfacial modifier DBTO (10.5 g) are mixed at 230° C. in a twin screw extruder, to make modified PC (PC-g-EAA).

PA6 is dried at 80° C. for 12 h in an oven, EPDM-g-MA is dried at 60° C. for 4 h in an oven, and the modified PC is dried at 120° C. for 4 h in an oven. Then, PA6 (4900 g), EPDM-g-MA (700 g) and modified PC (1400 g) are compounded via a twin screw extruder at 250° C. to make PA6/EPDM-g-MA/modified PC ternary blends.

The obtained blends are pelleted and dried, and are shaped into standard specimens by using injection molding. Morphology and mechanical properties are characterized on the standard specimens.

Example 3

PC is dried at 120° C. for 4 h in an oven, and EPDM-g-MA is dried at 60° C. for 4 h in an oven. Then PC (1050 g), EPDM-g-MA (1050 g) (1:1) and interfacial modifier DBTO (1.5 wt %) (10.5 g) are melt mixing at 230° C. via a twin screw extruder to make PC-g-EPDM-g-MA.

PA6 (4900 g) is dried at 80° C. for 12 h in an oven, and PC-g-EPDM-g-MA (2100 g) is dried at 120° C. for 4 h in an oven. PA6 and PC-g-EPDM-g-MA (7:3) are compounded via a twin screw extruder at 250° C. to make PA6/PC-g-EPDM-g-MA ternary blends.

The obtained blends are pelleted and dried, and are shaped into standard specimens by using injection molding. Morphology and mechanical properties are characterized on the standard specimens.

Comparative Example 1

PA6 (4900 g) is dried at 80° C. for 12 h in an oven, and EPDM-g-MA (2100 g) is dried at 60° C. for 4 h in an oven. PA6 and EPDM-g-MA are then mixed through a twin screw extruder at 250° C. The weight ratio of PA6 to EPDM-g-MA is 70/30.

The obtained blends are pelleted and dried, and are shaped into standard specimens by using injection molding. Morphology and mechanical properties are characterized on the standard specimens.

Comparative Example 2

PA6 is dried at 80° C. for 12 h in an oven, PC is dried at 120° C. for 4 h in an oven, and EPDM-g-MA is dried at 60° C. for 4 h in an oven.

PA6 (4900 g), PC (1050 g) and EPDM-g-MA (1050 g) are mixed through a twin screw extruder at 250° C. The ratio of PA6, PC and EPDM-g-MA is 70/15/15.

The obtained blends are pelleted and dried, and are shaped into standard specimens by using injection molding. Morphology and mechanical properties are characterized on the standard specimens.

TABLE 1

Comparison of mechanical properties for different blends

| Samples | Impact strength (KJ/m$^2$) | Young's modulus (MPa) |
|---|---|---|
| Neat PA6 | 5.38 | 1160 |
| PA6/EPDM-g-MA (Comparative example 1) | 28.4 | 531 |
| PA6/EPDM-g-MA/PP (Example 1) | 51.8 | 659 |
| PA6/EPDM-g-MA/PC without core/shell structure (Comparative example 2) | 10.6 | 849 |
| PA6/EPDM-g-MA/modified PC (Example 2) | 33.6 | 854 |
| PA6/EPDM-g-MA/PC with core/shell structure (Example 3) | 38.9 | 860 |

As shown in the Table 1, impact strength (i.e. toughness) increased from 5.38 KJ/m$^2$ (Neat PA6) to 28.4 J/m$^2$ (Comparative example 1) when adding EPDM-g-MA rubber into PA6. However, Young's modules (i.e. stiffness) decrease a lot in the Comparative example 1.

Compared with Comparative example 1, impact strength of sample in Example 1 even doubles, which shows that the toughness of PA6/EPDM-g-MA/PP is improved significantly when PP is added to form a core/shell structure of EPDM-g-MA/PP in the PA6 matrix (see FIG. 1), and Young's modulus of sample in Example 1 is greater than that of Comparative example 1. In addition, the stiffness of PA6/EPDM-g-MA/PP does not decrease too much when keeping high toughness relative to Neat PA6.

Figure 5:
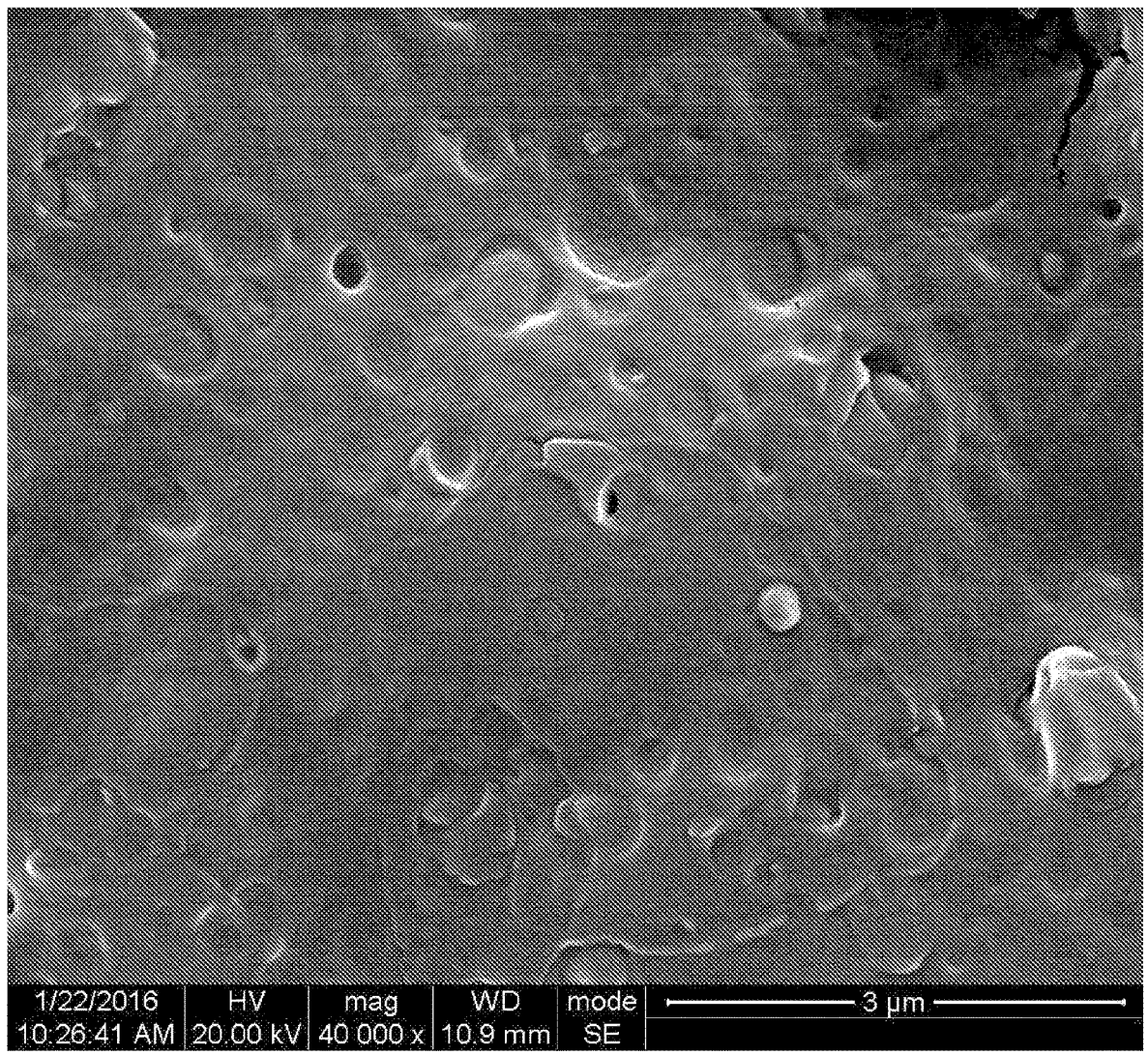
FIG. 5 shows a SEM micrograph of phase morphology for PA6/EPDM-g-MA/PC ternary blends with EPDM-g-MA etched according to comparative example 2 of the invention.

In the Comparative example 2, no core/shell structure was formed (see FIG. 5). The results indicate that its impact strength only increases slightly and Young's modulus decrease compared to neat PA6. In contrast, the impact strength increased very significantly and Young's modulus only decease slightly compared to neat PA6 when forming a core/shell structure in the Examples 2 and 3.

The results indicate that the samples of the present invention have high toughness while keeping better stiffness.

It will be apparent to those skilled in the art that various modifications and variations can be made in the present invention without departing from the scope or spirit of the invention. Thus, it is intended that the present invention cover such modifications and variations as come within the scope of the appended claims and their equivalents.

The invention claimed is:

1. A ternary blend having a core/shell structure comprising:
   (1) polyamide (PA) as a matrix, and
   (2) a core/shell particle, wherein the shell is ethylene-propylene-diene copolymer-g-maleic anhydride (EPDM-g-MA), and the core is polycarbonate (PC); wherein the ternary blend comprises 60-80 wt % of PA, 7.5-30 wt % of EPDM-g-MA and 2.5-30 wt % of PC based on the total weight of the ternary blend.

2. The ternary blend according to claim 1, wherein the ternary blend comprises 60-80 wt % of PA and 20-40% of core/shell particle based on the total weight of the ternary blend.

3. The ternary blend according to claim 1, wherein the ternary blend comprises 60-80 wt % of PA, 10-20 wt % of EPDM-g-MA and 10-20 wt % of PC based on the total weight of the ternary blend.

4. The ternary blend according to claim 1, wherein the PA is PA6 or PA66.

5. The ternary blend according to claim 1, wherein the ternary blend further comprises additives.

6. The ternary blend according to claim 5, wherein the additives comprise antioxidant, glass fiber, mineral filler, anti-hydrolytic agent, pigment, anti-wear agent, plasticizer, heat stabilizer, anti-foaming agent, antistatic agent, UV stabilizer, and combination thereof.

7. The ternary blend according to claim 1, wherein PC is ethylene copolymer modified PC.

8. The ternary blend according to claim 7, wherein PC is ethylene acrylic acid copolymer modified PC.

* * * * *